United States Patent [19]

Lietz et al.

[11] Patent Number: 5,043,145

[45] Date of Patent: Aug. 27, 1991

[54] MINIMAL HOLDUP REACTOR GRID

[75] Inventors: Arthur A. Lietz, Oakhurst; Arthur Yanowitz, Cranford; Patrick H. Terry, Middletown; Michael Bober, Jr., Toms River; William L. Wickman, Dayton, all of N.J.

[73] Assignee: Exxon Research & Engineering Company, Florham Park, N.J.

[21] Appl. No.: 126,252

[22] Filed: Nov. 27, 1987

Related U.S. Application Data

[63] Continuation of Ser. No. 898,493, Aug. 21, 1986, abandoned.

[51] Int. Cl.$^5$ .................... F27B 15/10; F27B 15/08
[52] U.S. Cl. ................... 422/143; 34/57 A; 422/144; 422/311
[58] Field of Search .................... 422/143, 144, 311; 34/57 A

[56] References Cited

U.S. PATENT DOCUMENTS

| | | | |
|---|---|---|---|
| 2,422,262 | 6/1947 | Russel, 3rd | 422/143 |
| 2,651,565 | 9/1953 | Bergman | 422/143 |
| 2,990,260 | 6/1961 | Mungen | 422/143 |

Primary Examiner—Robert J. Warden
Assistant Examiner—Amalia L. Santiago
Attorney, Agent, or Firm—Joseph J. Dvorak

[57] ABSTRACT

The present invention contemplates an improved grid for fluid bed reactors which minimizes catalyst coking in fluidized catalytic cracking operations by shedding catalyst dispersed through the grid from feed risers located therebelow. Indeed, the grid has a central portion containing a plurality of orifices therein and a downwardly extending annular ring portion for shedding catalyst outwardly and downwardly for collection and removal from the reactor vessel.

In the preferred embodiment of the present invention, the grid consists of a convex upper grid and a concave lower plate joined together and defining a disengaging zone therebetween. At least one riser opens into the disengaging zone for introducing the material to be fed into and separated in the reactor. The upper grid includes a solid annular ring which extends outwardly and downwardly from the point at which the upper grid and the lower plate are joined.

4 Claims, 2 Drawing Sheets

5,043,145

MINIMAL HOLDUP REACTOR GRID

This is a continuation, of application Ser. No. 898,493, filed Aug. 21, 1986, now abandoned.

FIELD OF THE INVENTION

This invention relates generally to a process and apparatus in which a fluid, such as a gas or liquid, is contacted with a solid such as a catalyst. More specifically, the present invention is especially concerned with a method and means of fluidized catalytic treatment of hydrocarbons.

BACKGROUND OF THE INVENTION

Fluid bed catalytic operations such as the catalyzed cracking of hydrocarbons are well known in the art. Indeed, fluidized catalytic cracking of hydrocarbon feeds is a widely practiced commercial process.

In recent years, there has been a need in fluidized catalytic cracking operations to process heavier hydrocarbon feedstocks as well as to produce products having higher octanes. This need has been met, in part, with the development of higher activity catalysts as well as by operating the reactors at significantly higher temperatures. Unfortunately these higher activity catalysts and higher operating temperatures can lead to secondary cracking of the hydrocarbon feedstock thereby producing undesirable coke on the catalyst and unwanted light gas products.

New reactor vessels such as the so-called transfer line reactors are designed to minimize these side reactions, in effect, by minimizing the time the catalyst and hydrocarbons (feed and reaction products) spend in the reactor vessel. Converting existing reactor vessels which utilize catalyst of significant tonnage in a so-called "bed", however, to transfer line systems is quite costly and hence frequently not economically attractive. Thus there remains a need for improving existing fluid catalytic cracking reactor vessels in such a way as to minimize catalyst coking and secondary cracking of hydrocarbons therein.

SUMMARY OF THE INVENTION

Accordingly, the present invention, in its simplest sense, contemplates an improved grid for fluid bed reactors which minimizes catalyst coking in fluidized catalytic cracking operations by shedding catalyst dispersed through the grid from feed risers located therebelow. Indeed, the grid has a central portion containing a plurality of orifices therein and a downwardly extending annular ring portion for shedding catalyst outwardly and downwardly for collection and removal from the reactor vessel.

In the preferred embodiment of the present invention, the grid consists of a convex upper grid and a concave lower plate joined together and defining a disengaging zone therebetween. At least one riser opens into the disengaging zone for introducing the material to be fed into and separated in the reactor. The upper grid includes a solid annular ring which extends outwardly and downwardly from the point at which the upper grid and the lower plate are joined.

In a particularly preferred embodiment of the present invention, a tent of refractory material is located within the center of the disengaging zone thereby reducing the volume of the disengaging zone in order that the time that the catalyst and hydrocarbons introduced therein will have for mixing in that zone.

These and other features of the present invention will be more readily understood upon a reading of the detailed description which follows in conjunction with the accompanying drawings.

DETAILED DESCRIPTION OF THE INVENTION

In the description which follows, like numerals indicate like elements.

Figure 1:
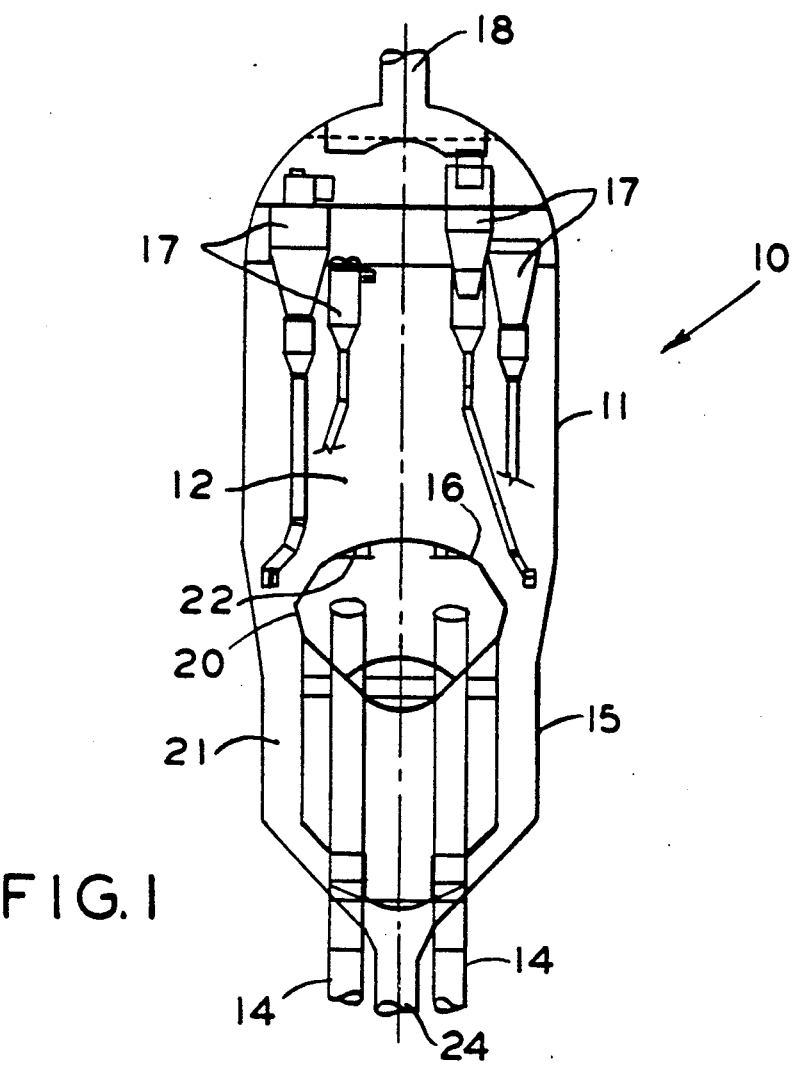
FIG. 1 is a schematic representation of a fluidized catalytic reactor utilizing the principles of the present invention.

Turning now to FIG. 1, there is shown a fluid cat cracking reactor vessel designated generally as 10. Vessel 10 has an upper cylindrical section 11 and a more narrow lower section 15. The reactor vessel 10 also includes at least one and preferably two risers 14 for introducing the catalyst and hydrocarbon reactants and products into the vessel 10 for catalyst separation therein. As shown, vessel 10 includes a diffusing grid 16 for dispersing the solids and vapors in the separation zone 12 of upper section 11 above grid 16. The grid 16 is generally horizontally disposed and supported within the reactor vessel 10 by well-known means such as support struts and the like (not shown). Disposed within the vessel 10 are a plurality of cyclones 17 for removal of solid particles such as catalyst from the vapors passing through the vessel. At the top of the vessel 10 an outlet 18 is provided for removing the hydrocarbon vapors. At the bottom of vessel 10 is an outlet 24 for removal of catalyst. As can be seen, the lower section 15 of the vessel 10 funnels downwardly toward outlet 24. Around the periphery of lower section 15 of the vessel is a stripper zone 21 through which catalyst passes and can be treated, for example with steam, to strip or remove volatile deposits from the solid catalyst.

Importantly in the practice of the present invention, the grid 16 has a solid annular ring portion 20 which slopes downwardly and outwardly in the direction of the stripper section 21 of vessel 10. Grid 16 with its skirt 20 extends radially for a distance to leave sufficient space between the outer most edge of the grid and the sidewall of the vessel for passage of catalyst therebetween. For example, the grid 16 will extend so as to cover from about 30% to about 90% of the cross-sectional area of the vessel in the immediate vicinity of the grid.

In a preferred embodiment of the present invention, splash plates 22 are provided on the bottom of the grid plate 16 directly above the risers 14 so that the material ascending through the riser into the reactor will first impinge upon the splash plates 22 before passing through the grid 16.

Figure 2:
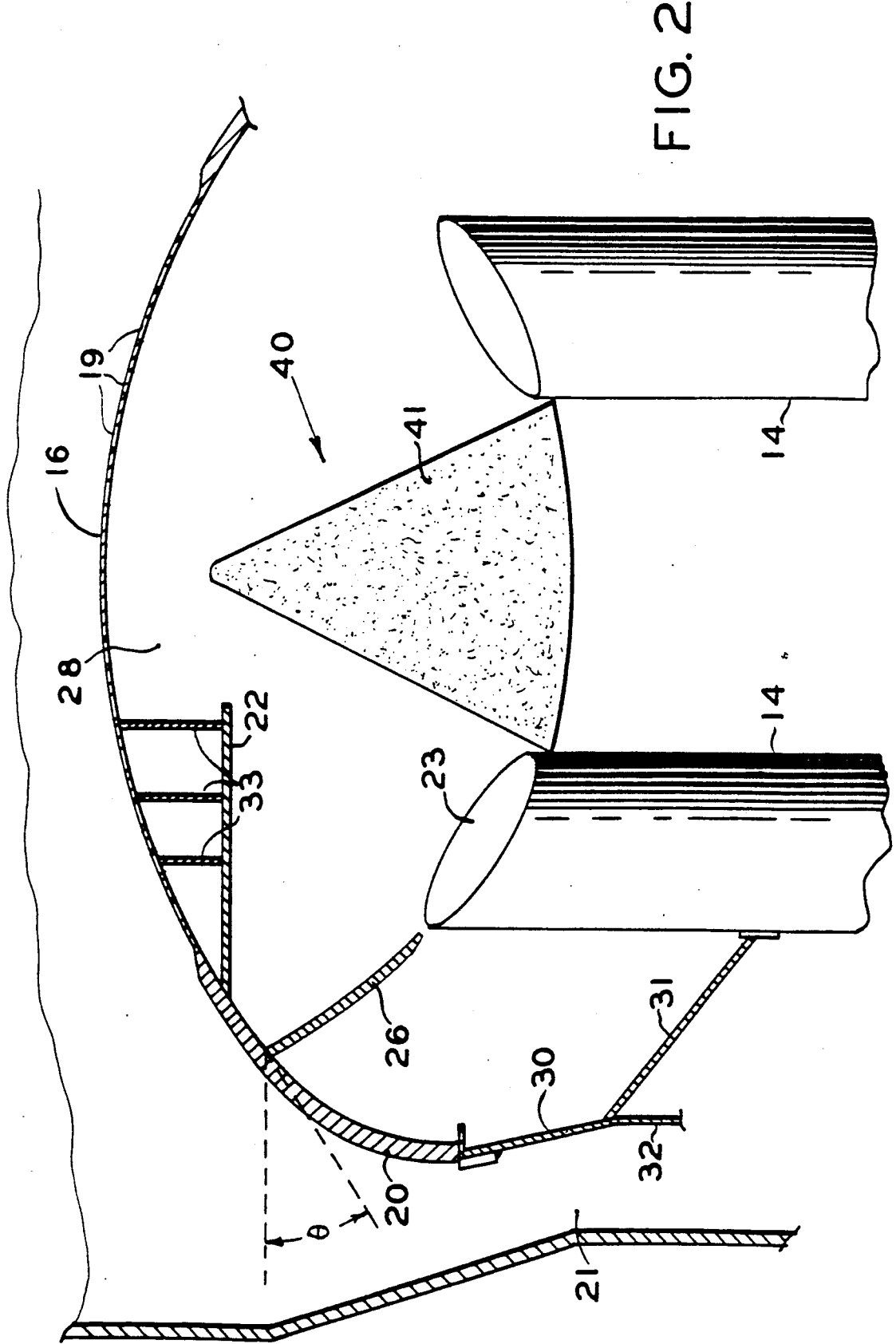
FIG. 2 is a sectional fragmentary view of a particularly preferred grid of the present invention.

Referring now to FIG. 2, there is shown a particularly preferred arrangement of the grid of the present invention. As can be seen in FIG. 2, grid 16 is convex in shape and is attached to a concave lower plate 26 which defines therebetween a disengaging zone 28. Openings are provided in the concave plate 26 to accommodate risers 14. The annular ring 20 of grid 16 extends downwardly substantially from the point at which the lower concave plate 26 joins the grid 16.

In the embodiment shown in FIG. 2, struts 30, 31 and 32 are provided for supporting the grid within the vessel 10. Also as shown, splash plate 22 is suspended by hangers 33. The splash plate 22 is directly in line with the opening 23 of riser 14. The splash plate 22, as previously mentioned, serves to absorb some of the momentum of the material exiting from the riser when it enters into the disengaging zone 28.

The bottom surface of splash plate 22 and grid 16 are provided with a refractory lining (not shown). The top surface of plate 26 also is provided with a refractory lining (not shown). Refractory linings may be applied on other surfaces as normally required.

As is shown in FIG. 2, the solid annular portion 20 extends downwardly and outwardly at an angle, $\theta$, in the range of about the angle of catalyst repose to about 70° as measured from a horizontal line drawn through the point where the grid 16 and plate 26 join. Preferably the annular ring 20 extends downwardly at an angle of 60°. The solid annular ring 20 may, of course, be a straight section substantially as shown in FIG. 1 or may be slightly curved as shown in FIG. 2.

Figure 3:
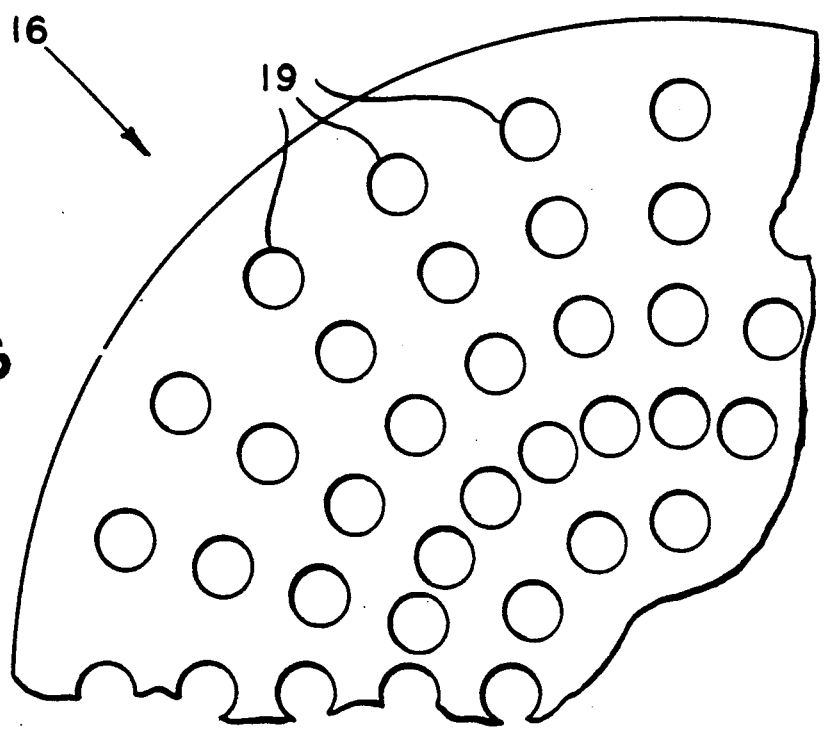
FIG. 3 is a fragmentary plan view of a grid of the present invention.

As can be seen in FIG. 3, the grid plate 16 is provided with a plurality of orifices 19. The number of orifices, of course, will depend upon factors such as the desired pressure drop across the grid, orifice diameter, feed rate, catalyst and the like. The method for determining the amount and size of the orifices is well known.

Returning to FIG. 2, in a particularly preferred embodiment of the present invention a tent 40 is located in the center of the disengaging zone 28. The tent is basically filled and covered with refractory material 41. Basically, the tent reduces the volume of the disengaging zone 28 and consequently reduces the time the catalyst and hydrocarbons are mixed in the disengaging zone. Other techniques may be employed to assure minimum residence time of catalyst and hydrocarbons in the disengaging zone; however, reactor vessel internals are frequently complex and place practical limitations on location and structure of grid components. For example, strength and spatial considerations may dictate that the grid 16 and plate 22 be constructed so as to define a disengaging zone somewhat larger than optimum. A properly sized refractory tent 40 rectifies that problem.

It will be appreciated by those skilled in the art that the construction of the present invention reduces catalyst holdup in fluid cat cracker vessels since the grid 16 sheds rather than accumulates catalyst. Additionally, the disengaging zone provided below the grid provides a relatively high velocity and low density riser exit zone which also minimizes catalyst holdup in the reactor vessel.

These and other advantages and features of the invention will be readily apparent upon perusal of this disclosure.

What is claimed is:

1. In a reactor vessel for fluid catalytic cracking of hydrocarbons having a grid horizontally disposed therein for dispersing catalyst and hydrocarbons introduced by risers below the grid for separation of said catalyst and hydrocarbons in a separation zone located above the grid, the improvement wherein said grid is convex in shape and wherein a concave plate is located below said grid, said plate being joined to said grid at the therefor edge of said plate and defining therebetween a disengaging zone, said disengaging zone having means for occupying a volume in said disengaging zone to provide a minimum residence time of catalyst and hydrocarbons in said disengaging zone, said grid having a central area with orifices therein and a downwardly and outwardly extending annular solid area, said solid area of said grid being less than the width of the reactor thereby providing a space between the edge of said grid and the side wall of the reactor vessel whereby catalyst which is separated from said hydrocarbons is shed from said grid for downward progression through said space and for removal from said vessel whereby catalyst holdup in said vessel is reduced, thereby minimizing catalyst coking in said vessel.

2. The improvement of claim 1 wherein said annular solid area extends outwardly and downwardly from the region where said grid and plate join.

3. The improvement of claim 2 whereby said annular solid area slopes downwardly at an angle in the range of about the angle of catalyst repose to about 70° from the horizontal.

4. The improvement of claim 2 wherein the means for occupying a volume in the disengaging zone is a refractory covered and filled structure.

* * * * *